(12) United States Patent
Daniels (10) Patent No.: US 8,607,913 B2
(45) Date of Patent: Dec. 17, 2013

(54) MOTORIZED THREE-WHEELED VEHICLE REAR STEERING MECHANISM

(71) Applicant: Ben Daniels, Chestnut Hills, MA (US)

(72) Inventor: Ben Daniels, Chestnut Hills, MA (US)

( * ) Notice: Subject to any disclaimer, the term of this patent is extended or adjusted under 35 U.S.C. 154(b) by 0 days.

(21) Appl. No.: 13/657,805

(22) Filed: Oct. 22, 2012

(65) Prior Publication Data

US 2013/0098703 A1 Apr. 25, 2013

Related U.S. Application Data

(60) Provisional application No. 61/549,525, filed on Oct. 20, 2011.

(51) Int. Cl.
*B62D 61/06* (2006.01)

(52) U.S. Cl.
USPC ............................................................ 180/210

(58) Field of Classification Search
USPC ................................................. 180/210, 211
See application file for complete search history.

(56) References Cited

U.S. PATENT DOCUMENTS

| | | | | |
|---|---|---|---|---|
| 5,307,891 A * | 5/1994 | Shaw et al. | ................... | 180/400 |
| 5,329,451 A * | 7/1994 | Notsu | .............................. | 701/41 |
| 5,379,220 A * | 1/1995 | Allen et al. | ...................... | 701/41 |
| 5,639,181 A * | 6/1997 | Swisher, Jr. | .................. | 299/39.1 |
| 6,735,507 B2 * | 5/2004 | Grougan et al. | ................ | 701/41 |
| 6,806,809 B2 * | 10/2004 | Lee et al. | ....................... | 340/431 |
| 7,722,063 B2 * | 5/2010 | Dieziger | ................ | 280/124.103 |
| 7,871,085 B2 * | 1/2011 | Sasaki | ........................ | 280/5.524 |
| 7,921,955 B2 * | 4/2011 | Spangler | ....................... | 180/210 |
| 8,068,955 B2 * | 11/2011 | Yanagi | ............................. | 701/43 |
| 8,172,014 B2 * | 5/2012 | Brown et al. | ................... | 180/22 |
| 8,249,775 B2 * | 8/2012 | Van Den Brink | .............. | 701/38 |
| 8,251,375 B2 * | 8/2012 | Hara et al. | ................ | 280/5.509 |
| 8,381,860 B2 * | 2/2013 | Noyer | ........................... | 180/211 |
| 8,397,844 B2 * | 3/2013 | Vasant | ........................ | 180/65.1 |
| 2003/0102176 A1 * | 6/2003 | Bautista | ....................... | 180/210 |
| 2006/0022422 A1 * | 2/2006 | Tasma | ................... | 280/124.135 |
| 2006/0229782 A1 * | 10/2006 | Deng et al. | ....................... | 701/42 |
| 2007/0152424 A1 * | 7/2007 | Deng et al. | ..................... | 280/432 |
| 2009/0205894 A1 * | 8/2009 | Eaton | ............................ | 180/210 |
| 2011/0278088 A1 * | 11/2011 | Weihl et al. | ................... | 180/400 |
| 2012/0241239 A1 * | 9/2012 | Holroyd et al. | .............. | 180/210 |
| 2012/0319374 A1 * | 12/2012 | Watanabe | .................... | 280/91.1 |
| 2013/0119627 A1 * | 5/2013 | Tashiro | ...................... | 280/93.51 |

* cited by examiner

*Primary Examiner* — Joseph Rocca
*Assistant Examiner* — Nicole Verley (57) ABSTRACT

A system that steers the rear wheels of the three wheeled vehicle in coordination with the operator turning the front wheel that improves handling, performance and safety. The rear wheels are steered by a rear end mounted powered steering rack that is controlled by a steering control computer that receives input from a variety of sensors including a sensor for vehicle speed and a sensor in the steering neck that measures the angular rotation of the handlebars as they are turned by the operator. Based on these inputs, using proprietary programming the steering control computer calculates the rate, timing and direction to turn the rear wheels. Rear steering offers advantages over front wheel only steering including being easier for the operator to turn the vehicle, a smaller turning radius, better straight line stability, better high speed handling, improved corning performance, improved steering response and improved safety.

19 Claims, 5 Drawing Sheets

MOTORIZED THREE-WHEELED VEHICLE REAR STEERING MECHANISM

FIELD OF THE INVENTION

The present invention relates to a rear steering mechanism for a three-wheeled vehicle and, more particularly, to a system that turns the rear wheels in coordination with the operator's turning of the front wheel.

BACKGROUND OF THE INVENTION

It is well known that two standards of ground vehicles exist. One type is represented by two-wheel vehicles (example motorcycles) that are turned by the operator first countersteering (turning the handlebars slightly in the opposite direction of the desired turn) then leaning into the turn and keeping the center of gravity in the plane of the apparent vertical due to combined gravitational and centrifugal forces. Lean angle is determined by speed and turn radius, i.e. the faster the speed and the tighter the turn radius the more the operator is required to lean the motorcycle while turning. This lean also serves to stabilize the motorcycle throughout the turn.

The other type is represented by vehicles with stationary stability, such as three-wheeled vehicles (example motorized tricycles) or four-wheeled vehicles (example automobiles). These vehicles steer by turning the front wheel(s) by way of handlebars or a steering wheel. During a turn centrifugal and gravitational forces combine to force the vehicle toward the outside of the turn. If the forces become too great the vehicle can roll over. This is a greater potential problem in a three-wheeled vehicle that has two rear wheels and only one front wheel situated in line with the vehicle's centerline.

An independent rear suspension provides a far better quality and more comfortable ride for the operator and passenger particularly when travelling over a bumpy or uneven road surface, however when turning hard a three-wheeled vehicle can sway or roll to the outside of the turn as the rear suspension components on the inside of the turn are compressed and the suspension components on the outside of the turn are extended. This body roll shifts the center of gravity to the outside wheel in curves and creates a less stable condition. The sharper the turn and the higher the speed the greater the resulting body roll and the less stable the three-wheeled vehicle becomes. To compensate for this condition, the operator must slow down or the three-wheeled vehicle may tip over. A more rigid non-independent rear suspension design wherein the left and right rear wheels are linked together and can't move independently reduces this effect, however this design results in greater unsprung weight. Whereas movement of suspension components, i.e. their ability to track and maintain traction over bumpy or imperfect road surfaces, is inversely proportional to the unsprung weight rigid non-independent designs will result in a far less comfortable ride for the operator and passenger and can result in the operator and passenger and/or the entire vehicle being bounced around when going over bumps as the bumps are not being absorbed by the vehicle's suspension.

Three-wheeled vehicles have a relatively small front tire contact patch compared to the contact patch of the rear tires. In some circumstances, including wet and other slippery road conditions, the small front tire contact area does not generate sufficient traction to turn the vehicle and the front tire will skid along the road surface and the vehicle will keep going in a straight line. If a larger diameter front tire which has a larger contact patch with the road surface is installed, front wheel traction will be increased however the vehicle will become more difficult to turn due to increased friction from the increased contact patch and increased gyroscopic forces from the increased front wheel mass and will requires greater force from the operator to turn the front wheel. As the vehicle's speed increases the vehicle will become increasingly difficult to turn as the force required to turn the front wheel increases. There is no practical way to attach a powered steering mechanism to the front end of a three-wheeled vehicle that uses a motorcycle style front fork to assist with turning the front wheel and thus make steering easier.

Several designs exist that attempt to improve handling and reduce body roll and make turning easier.

U.S. Pat. Nos. 7,343,997, 7,591,337, 4,064,957, 6,511,078, 6,435,522, 4,487,429, 4,159,128, 6,406,036, 6,328,125, 6,250,649, 6,062,581, 5,169,166, 5,116,069, 5,040,812, 4,974,863, 4,903,857, 4,678,053, 4,660,853, 4,484,648, and 4,088,199 attempt to improve handling, make turning easier and reduce body roll by tilting the three-wheeled vehicle body and/or wheels.

There are several shortcomings of the tilting solution. First, the tilting mechanisms are complicated and have many component parts and are therefore complicated and expensive to manufacture, and can be prone to component failure. Second, any tilting system requires the use of motorcycle tires that necessarily have a rounded profile to enable the motorcycle to lean during turns, however a consequence of this design is that a motorcycle tire has a much smaller contact patch with the road surface than a comparable size automobile tire that is not designed to lean. Automobile tires perform better in drive systems where the two rear wheels are driven by the vehicle's motor, as is the configuration on virtually all three-wheeled vehicles, because they provide better traction due to their flatter profile and resulting larger contact patch with the road surface, are more durable and last longer, and are more cost effective.

A design exists that attempts to reduce body roll and improve handling with a rigid rear suspension design that does not allow the vehicle to lean or squat while turning. This design is intended to minimize flex in the swing-arm and rear-end system and features a differential rear-end with internal solid axles. The swing-arm is a one piece reinforced design, specially constructed to reduce all torsion effects.

The problem with the rigid design that while it eliminates leaning in turns vehicles with this design do not perform well on rough or bumpy roads and provide a poor quality and uncomfortable ride for the operator and passenger for a couple of reasons. First, this design does not allow the rear wheels to move independently of each other making it more difficult for them to follow the contour of the road. Second, the unsprung weight of a suspension system having a solid rear axle is greater than for an independent suspension design and thus further limits the ability of the rear wheels to follow bumps in the road and maintain traction as movement is inversely proportional to the unsprung weight.

It would be advantageous to provide a steering system that provides a comfortable ride for the operator and passenger on a three-wheeled vehicle.

It would also be advantageous to provide a steering system that reduces three-wheeled vehicle turning radius.

It would further be advantageous to provide a steering system that increases three-wheeled vehicle straight line stability.

It would further be advantageous to provide a steering system that improves three-wheeled vehicle high speed handling.

It would further be advantageous to provide a steering system that improves three-wheeled vehicle cornering performance.

It would further be advantageous to provide a steering system that improves three-wheeled vehicle steering response.

It would further be advantageous to provide a steering system that improves three-wheeled vehicle safety.

SUMMARY OF THE INVENTION

In accordance with the present invention, there is provided a system that steers the rear wheels of the three-wheeled vehicle in coordination with the operator turning the front wheel that improves handling, performance and safety. The rear wheels are moved left and right by a rear end mounted steering rack that is electric, pneumatic, hydraulic or otherwise powered. The steering rack function is controlled by the rear steering control computer. The rear steering control computer receives input from a variety of sensors including but not limited to sensors for vehicle speed and a sensor in the steering neck that senses the angular rotation of the handlebars as they are turned by the operator. Based on these inputs, using proprietary programming the rear steering control computer calculates direction, rate and degree for the steering rack to turn the rear wheels. Rear steering offers some advantages over front wheel only steering including being easier for the operator to turn the three-wheeled vehicle, a smaller turning radius, better straight line stability, better high speed handling, improved corning performance, improved steering response and improves safety.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
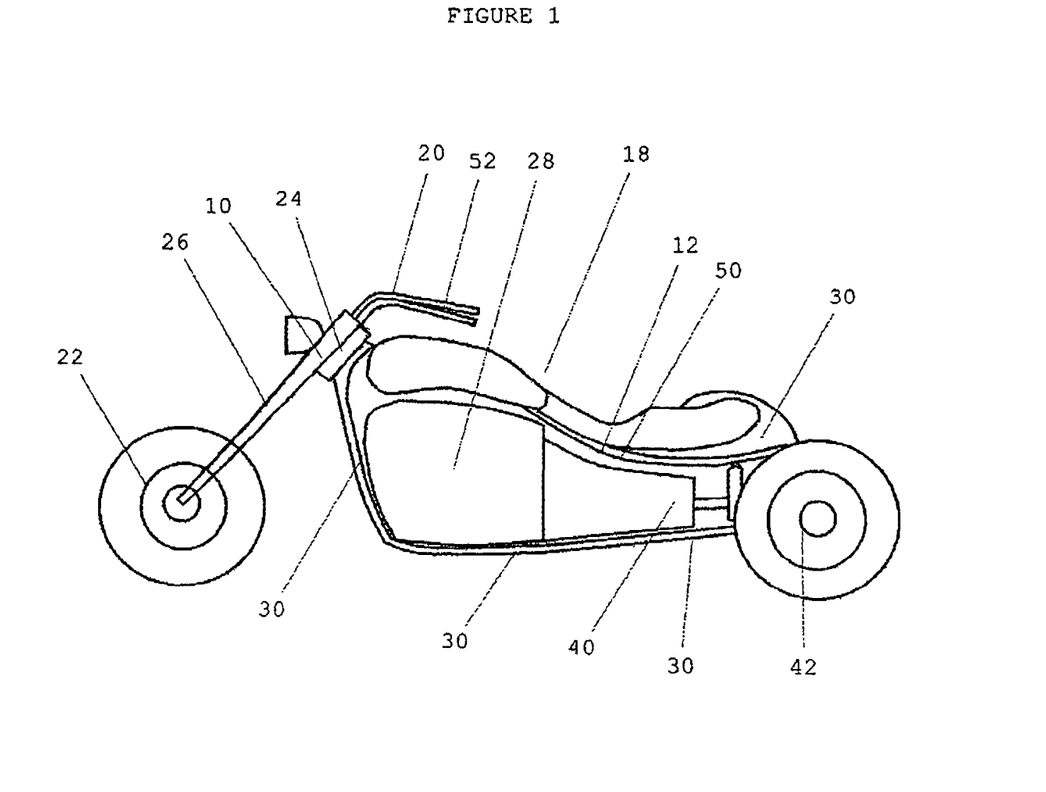
FIG. 1 is a left view of a complete motorized three-wheeled vehicle with the body removed of the invention.

FIG. 1 is a left view of a complete motorized three-wheeled vehicle 18 with the body removed of the invention. A motorized three-wheeled vehicle 18 has a frame 30 which has steering neck 24 at the front end to which is mounted the front end assembly 26 at the bottom of which is mounted the front wheel assembly 22 and at the top is mounted the handlebars 20 that are used by the operator for the purpose of steering the vehicle.

Figure 2:
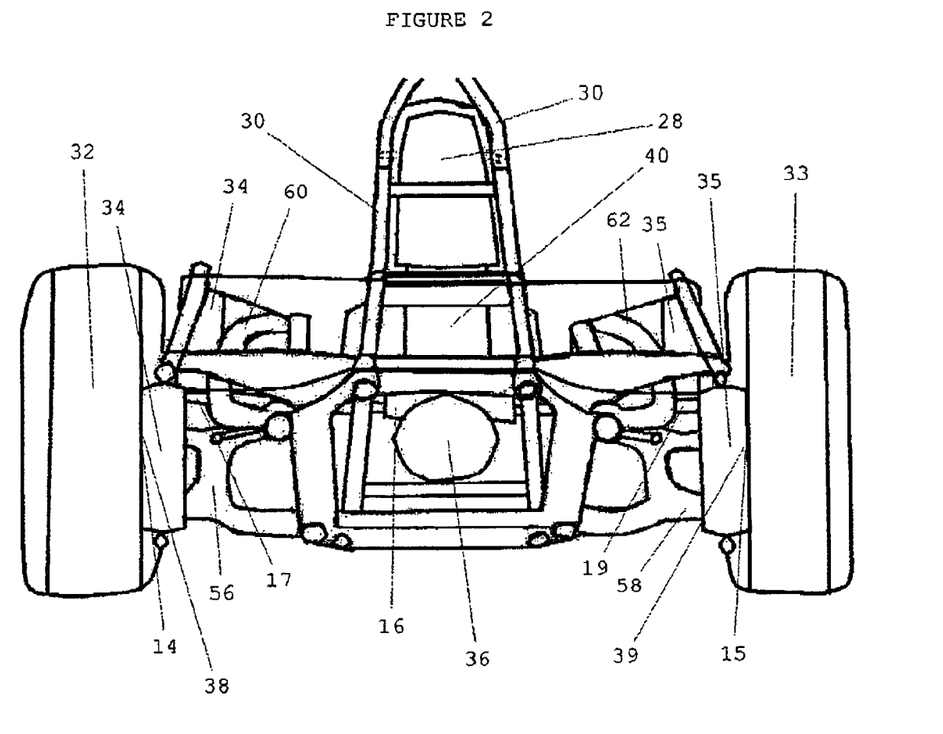
FIG. 2 is a rear view of a motorized three-wheeled vehicle as shown in FIG. 1.

FIG. 2 is a rear view of a motorized three-wheeled vehicle 18 as shown in FIG. 1. Power for vehicle movement is generated by a motor 28 which can be internal combustion, hybrid, electric or other power source and transmitted to the left rear wheel and tire assembly 32 and the right rear wheel and tire assembly 33 through the transmission 40 and rear end 36. Rear shock absorption is provided by the left rear shock absorbing unit 34 and the right rear shock absorbing unit 35 each of which can be made up of one or more individual shock absorbers.

Figure 3:
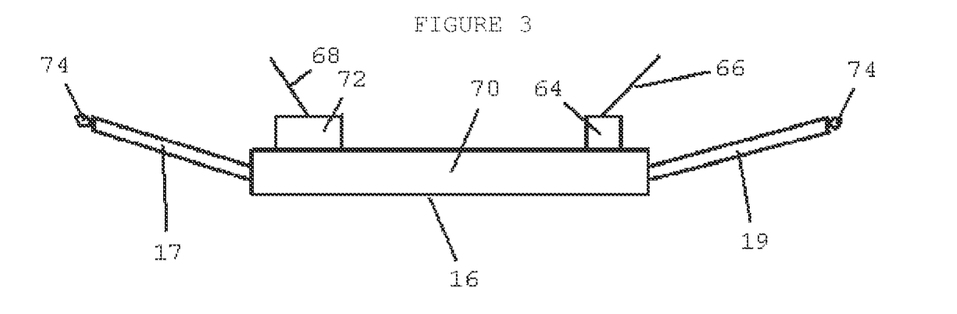
FIG. 3 is a detail view of a rear steering assembly of the invention.

FIG. 3 is a detail view of a rear steering assembly 16 of the invention that consists of the steering mechanism 70 which is powered by the rear steering assembly power unit 72 which can be electric, pneumatic, hydraulic or other source of power and which moves the left rear wheel and tire assembly 32 and the right rear wheel and tire assembly 33 with the left rear steering shaft 17 and right rear steering shaft 19 which are connected by the steering shaft connector 74 to the steering shaft mount 84 on the respective left and right rear steerable wheel hub mounts. Regardless of the type of rear steering assembly 16 used, electrical power is supplied by the vehicle electrical system 50 through the rear steering unit power wire 68.

Figure 4:
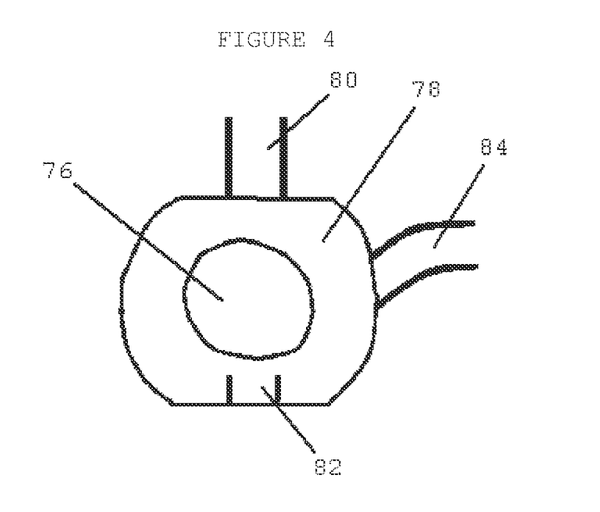
FIG. 4 is a detail view of a right rear steerable wheel hub mount of the invention.

FIG. 4 is a detail view of a right rear steerable wheel hub mount 39 of the invention which is a mirror image of a left rear steerable wheel hub mount 38 that both consist of a central hub mount bearing 76 and the hub mount body assembly 78 which is attached to the respective left upper rear suspension arm 60 and right upper rear suspension arm 62 by the upper rear suspension arm mount 80 and to the respective left lower rear suspension arm 56 and right lower rear suspension arm 58 by the lower rear suspension arm mount 82.

Figure 5:
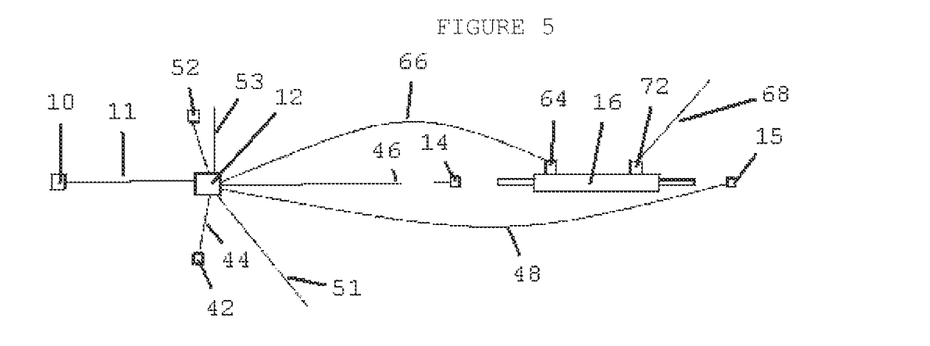
FIG. 5 is a detail view of a schematic of the components and connections of the invention.

FIG. 5 is a detail view of a schematic of the components and connections of the invention showing a front wheel position sensor 10 that is mounted in the steering neck 24 which functions to measure the degree of rotation of the front wheel as the operator turns the handlebars 20 and transmits this information to the rear steering control computer 12 through the front wheel position sensor connection 11. Additional inputs to the rear steering control computer 12 include vehicle road speed from the vehicle speed sensor 42 through the vehicle speed sensor connection 44 and the position of the left, rear wheel and tire assembly 32 and the right rear wheel and tire assembly 33 relative to the vehicle's longitudinal axis from the left rear wheel position sensor 14 and the right rear wheel position sensor 15 through the left rear wheel position sensor connection 46 and right rear wheel position sensor connection 48 respectively. The rear steering control computer 12 receives power from the vehicle electrical system through the wire to the vehicle electrical system 51. The rear steering control computer 12 is turned on and off by the operator using the system control switch 52 which transmits information over the system control switch wire 54, and also allows the operator to select amongst one or more preset steering profiles. Based on the degree and rate of angular rotation of the front wheel, the vehicle's road speed and the steering setting selected by the operator the rear steering control computer 12 calculates the degree, rate and direction to rotate the rear wheels to facilitate the desired turn and transmits this information through the rear steering unit control wire 66 to the rear steering assembly electronic control unit 64 which directs the rear steering assembly 16 to turn the rear wheels.

If the system fails the wheels will return to the neutral position which is in line with the vehicle's direction of travel. If either rear wheel fails to return to the neutral position, the rear steering control computer will send a signal to the vehicle's Engine Control Unit to limit vehicle speed to 5 miles per hour. When the system is turned off the vehicle will perform like any conventional motorized three-wheeled vehicle.

Thus, in summary it can be seen that what this invention provides is an integrated system that improves handling, performance in turns and overall safety in three-wheeled vehicles by proportionately turning the rear wheels in coordination with the front wheel. A position sensor in the front end detects turning of the front wheel by the operator and transmits this information to the rear steering control computer. Using this data along with the vehicle's road speed and the steering preset selected by the operator, using proprietary programming the rear steering control computer calculates the correct time, degree and direction to pivot the rear wheels. This information is transmitted to the rear steering assembly electronic control unit in the rear steering assembly which directs the steering mechanism that is connected to the steerable rear wheel hub mounts by the left and right steering shafts to move the rear wheels. Position of the rear wheels in relation to the longitudinal axis is detected by the left and right rear wheel position sensors which provide feedback to the rear steering control computer. System operation is controlled by the operator who can manually turn the system on or off and can select between one or more preset steering profiles.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A three wheeled vehicle rear steering mechanism for improving steering by turning the rear wheels in coordination with the front wheel, comprising:

means for sensing any left or right turning movement of the front wheel;

means for connecting front wheel position sensor to steering computer, electrically connected to said means for sensing any left or right turning movement of the front wheel;

means for controlling rear steering system and deciding degree and direction to deflect rear wheels, electrically connected to said means for connecting front wheel position sensor to steering computer;

means for providing the mechanism for attaching the left rear wheel assembly to the vehicle and a mechanism for the rear steering assembly to move the left rear wheel assembly left and right;

means for providing the mechanism for attaching the right rear wheel and tire assembly to the vehicle and a mechanism for the rear steering assembly to move the right wheel and tire assembly left and right;

means for detecting the deflection of the left rear wheel as it relates to the longitudinal axis of the vehicle;

means for connecting the left rear wheel position sensor to the steering control computer, electrically connected to said means for detecting the deflection of the left rear wheel as it relates to the longitudinal axis of the vehicle, and electrically connected to said means for controlling rear steering system and deciding degree and direction to deflect rear wheels;

means for detecting the deflection of the right rear wheel as it relates to the longitudinal axis of the vehicle;

means for connecting the right rear wheel position sensor to the steering control computer, electrically connected to said means for detecting the deflection of the right rear wheel as it relates to the longitudinal axis of the vehicle, and electrically connected to said means for controlling rear steering system and deciding degree and direction to deflect rear wheels;

means for moving the rear wheels according to the signal from the rear steering control computer;

means for controlling the movement of the rear steering assembly as it receives input from the steering control computer, electrically connected to said means for moving the rear wheels according to the signal from the rear steering control computer;

means for providing power to the steering mechanism, electrically connected to said means for moving the rear wheels according to the signal from the rear steering control computer;

means for connecting the left rear wheel steerable hub to the steering assembly for the purpose of transmitting movement from the steering assembly to the left rear wheel steerable hub, mechanically connected to said means for moving the rear wheels according to the signal from the rear steering control computer, rotationally attached to said means for detecting the deflection of the left rear wheel as it relates to the longitudinal axis of the vehicle, and mechanically connected to said means for providing the mechanism for attaching the left rear wheel assembly to the vehicle and a mechanism for the rear steering assembly to move the left rear wheel assembly left and right;

means for connecting the right rear wheel steerable hub to the steering assembly for the purpose of transmitting movement from the steering assembly to the right rear wheel steerable hub, mechanically connected to said means for moving the rear wheels according to the signal from the rear steering control computer, rotationally attracted to said means for detecting the deflection of the right rear wheel as it relates to the longitudinal axis of the vehicle, and mechanically connected to said, means for providing the mechanism for attaching the right rear wheel and tire assembly to the vehicle and a mechanism for the rear steering assembly to move the right wheel and tire assembly left and right;

means for providing a means for attaching the steering shaft to the steerable wheel hub, rotationally connected to said means for connecting the right rear wheel steerable hub to the steering assembly for the purpose of transmitting movement from the steering assembly to the right rear wheel steerable hub;

means for measuring vehicle road speed; and means for allowing operator to engage and disengage the rear steering system.

2. The three wheeled vehicle rear steering mechanism in accordance with claim 1, wherein said means for sensing any left or right turning movement of the front wheel comprises a front wheel position sensor.

3. The three wheeled vehicle rear steering mechanism in accordance with claim 1, wherein said means for connecting front wheel position sensor to steering computer comprises a front wheel position sensor connector.

4. The three wheeled vehicle rear steering mechanism in accordance with claim 1, wherein said means for controlling rear steering system and deciding degree and direction to deflect rear wheels comprises a steering control computer.

5. The three wheeled vehicle rear steering mechanism in accordance with claim 1, wherein said means for providing the mechanism for attaching the left rear wheel assembly to the vehicle and a mechanism for the rear steering assembly to move the left rear wheel assembly left and right comprises a left rear steerable wheel hub.

6. The three wheeled vehicle rear steering mechanism in accordance with claim 1, wherein said means for providing the mechanism for attaching the right rear wheel and tire assembly to the vehicle and a mechanism for the rear steering assembly to move the right wheel and tire assembly left and right comprises a right rear steerable wheel hub.

7. The three wheeled vehicle rear steering mechanism in accordance with claim 1, wherein said means for detecting the deflection of the left rear wheel as it relates to the longitudinal axis of the vehicle comprises a left rear wheel position sensor.

8. The three wheeled vehicle rear steering mechanism in accordance with claim 1, wherein said means for connecting the left rear wheel position sensor to the steering control computer comprises a left rear wheel position sensor connector.

9. The three wheeled vehicle rear steering mechanism in accordance with claim 1, wherein said means for detecting the deflection of the right rear wheel as it relates to the longitudinal axis of the vehicle comprises a right rear wheel position sensor.

10. The three wheeled vehicle rear steering mechanism in accordance with claim 1, wherein said means for connecting the right rear wheel position sensor to the steering control computer comprises a right rear wheel position sensor connector.

11. The three wheeled vehicle rear steering mechanism in accordance with claim 1, wherein said means for moving the rear wheels according to the signal from the rear steering control computer comprises a rear steering assembly.

12. The three wheeled vehicle rear steering mechanism in accordance with claim 1, wherein said means for controlling the movement of the rear steering assembly as it receives input from the steering control computer comprises a steering assembly electronic control unit.

13. The three wheeled vehicle rear steering mechanism in accordance with claim 1, wherein said means for providing power to the steering mechanism comprises a steering assembly power unit.

14. The three wheeled vehicle rear steering mechanism in accordance with claim 1, wherein said means for connecting the left rear wheel steerable hub to the steering assembly for the purpose of transmitting movement from the steering assembly to the right rear wheel steerable hub comprises a left rear steering shaft.

15. The three wheeled vehicle rear steering mechanism in accordance with claim 1, wherein said means for connecting the right rear wheel steerable hub to the steering assembly for the purpose of transmitting movement from the steering assembly to the right rear wheel steerable hub comprises a right rear steering shaft.

16. The three wheeled vehicle rear steering mechanism in accordance with claim 1, wherein said means for providing a means for attaching the steering shaft to the steerable wheel hub comprises a steering shaft connector.

17. The three wheeled vehicle rear steering mechanism in accordance with claim 1, wherein said means for measuring vehicle road speed comprises a vehicle speed sensor.

18. The three wheeled vehicle rear steering mechanism in accordance with claim 1, wherein said means for allowing operator to engage and disengage the rear steering system comprises an on position, off position system control switch.

19. A three wheeled vehicle rear steering mechanism for improving steering by turning the rear wheels in coordination with the front wheel, comprising:
  a front wheel position sensor, for sensing any left or right turning movement of the front wheel;
  a front wheel position sensor connector, for connecting front wheel position sensor to steering computer, electrically connected to said front wheel position sensor;
  a steering control computer, for controlling rear steering system and deciding degree and direction to deflect rear wheels, electrically connected to said front wheel position sensor connector;
  a left rear steerable wheel hub, for providing the mechanism for attaching the left rear wheel assembly to the vehicle and a mechanism for the rear steering assembly to move the left rear wheel assembly left and right;
  a right rear steerable wheel hub, for providing the mechanism for attaching the right rear wheel and tire assembly to the vehicle and a mechanism for the rear steering assembly to move the right wheel and tire assembly left and right;
  a left rear wheel position sensor, for detecting the deflection of the left rear wheel as it relates to the longitudinal axis of the vehicle;
  a left rear wheel position sensor connector, for connecting the left rear wheel position sensor to the steering control computer, electrically connected to said left rear wheel position sensor, and electrically connected to said steering control computer;
  a right rear wheel position sensor, for detecting the deflection of the right rear wheel as it relates to the longitudinal axis of the vehicle;
  a right rear wheel position sensor connector, for connecting the right rear wheel position sensor to the steering control computer, electrically connected to said right rear wheel position sensor, and electrically connected to said steering control computer;
  a rear steering assembly, for moving the rear wheels according to the signal from the rear steering control computer;
  a steering assembly electronic control unit, for controlling the movement of the rear steering assembly as it receives input from the steering control computer, electrically connected to said rear steering assembly;
  a steering assembly power unit, for providing power to the steering mechanism, electrically connected to said rear steering assembly;
  a left rear steering shaft, for connecting the left rear wheel steerable hub to the steering assembly for the purpose of transmitting movement from the steering assembly to the right rear wheel steerable hub, mechanically connected to said rear steering assembly, rotationally attached to said left rear wheel position sensor, and mechanically connected to said left rear steerable wheel hub;
  a right rear steering shaft, for connecting the right rear wheel steerable hub to the steering assembly for the purpose of transmitting movement from the steering assembly to the right rear wheel steerable hub, mechanically connected to said rear steering assembly, rotationally attached to said right rear wheel position sensor, and mechanically connected to said right rear steerable wheel hub;
  a steering shaft connector, for providing a means for attaching the steering shaft to the steerable wheel hub, rotationally connected to said right rear steering shaft;

a vehicle speed sensor, for measuring vehicle road speed; and an on position, off position system control switch, for allowing operator to engage and disengage the rear steering system.

\* \* \* \* \*